United States Patent

Kotone et al.

[11] 3,896,149
[45] July 22, 1975

[54] NOVEL PYRROLIDONE DERIVATIVES AND MANUFACTURING THE SAME

[75] Inventors: Akira Kotone, Nara; Yoshiyuki Hiri; Tadashi Masada, both of Osaka, all of Japan

[73] Assignee: Sakai Chemical Industry Company, Limited, Japan

[22] Filed: June 7, 1973

[21] Appl. No.: 367,890

[30] Foreign Application Priority Data
June 7, 1972 Japan............................... 47-57238

[52] U.S. Cl.................. 260/326.25; 260/247.2 A; 260/293.71; 260/326.45; 260/471 A; 260/518 R; 424/274
[51] Int. Cl............................................ C07d 27/08
[58] Field of Search.................. 260/326.45, 326.25

[56] References Cited
OTHER PUBLICATIONS
Wagner et al., *Synthetic Organic Chemistry*, (1953), p. 576 [& orig. J. Am. Chem. Soc., Vol. 54: 2436 (1932)].

*Primary Examiner*—Joseph A. Narcavage
*Attorney, Agent, or Firm*—Armstrong, Nikaido & Wegner

[57] ABSTRACT
A pyrrolidone derivative represented by the formula

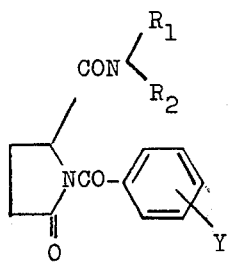

wherein $R_1$ and $R_2$ are respectively alkyls having 1 to 6 carbon atoms and taken collectively form a 4-to 6-membered ring structure containing an additional nitrogen or oxygen hetero atom, and Y is hydrogen or halogen atom; a pharmaceutical composition containing said compound; and a method for manufacturing said compound by reacting pyrrolidine-5-one-2-(N,N-dialkyl)-carboxamide represented by the formula

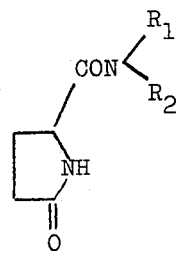

wherein $R_1$ and $R_2$ are the same as defined above with an aroyl halide represented by the formula

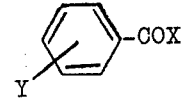

wherein X and Y are the same as defined above.

3 Claims, No Drawings

NOVEL PYRROLIDONE DERIVATIVES AND MANUFACTURING THE SAME

This invention relates to novel pyrrolidone derivatives having excellent pharmacological activities and the process for producing the same.

The pyrrolidone derivatives of this invention are novel compounds represented by the formula

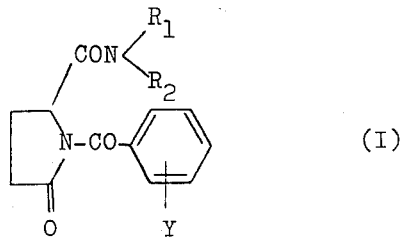

(I)

wherein $R_1$ and $R_2$ are respectively alkyl groups having 1 to 6 carbon atoms and taken collectively form a 4- to 6- membered ring structure containing an additional nitrogen or oxygen hetero atom, and Y is hydrogen or halogen atom. The present compounds have excellent pharmacological activities such as an inhibitive action on the secretion of gastric juice and are especially effective in the treatment of peptic ulcer. They are useful also as starting materials for preparing 2-aroylamide-N,N-dialkylisoglutaramine acid derivatives which have already been known as inhibitors on the secretion of gastric juice.

Representative examples of the novel pyrrolidone derivatives of this invention are listed in Table 1 below.

Table 1

| No. | Compound | Formula | |
|---|---|---|---|
| 1 | 1-benzoyl-pyrrolidine-5-one-2-(N,N-dimethyl)-carboxamide | [structure with CON(CH$_3$)$_2$] | (M.P. 204°–205°C) |
| 2 | 1-benzoyl-pyrrolidine-5-one-2-(N,N-diethyl)-carboxamide | [structure with CON(C$_2$H$_5$)$_2$] | (Viscous oil) |
| 3 | 1-benzoyl-pyrrolidine-5-one-2-(N,N-di-n-propyl)-carboxamide | [structure with CON(n-C$_3$H$_7$)$_2$] | (M.P. 77°–78°C) |
| 4 | 1-benzoyl-pyrrolidine-5-one-2-(N,N-di-n-butyl)-carboxamide | [structure with CON(n-C$_4$H$_9$)$_2$] | (M.P. 56°–58°C) |
| 5 | 1-benzoyl-pyrrolidine-5-one-2-(N,N-dipentyl)-carboxamide | [structure with CON(n-C$_5$H$_{11}$)$_2$] | (Oil) |
| 6 | 1-benzoyl-pyrrolidine-5-one-2-(N,N-dihexyl)-carboxamide | [structure with CON(n-C$_6$H$_{13}$)$_2$] | (Oil) |
| 7 | 1-benzoyl-2-morpholinocarbonyl-pyrrolidine-5-one | [structure with morpholino-CON] | |

Table 1—Continued

| No. | Compound | Formula | |
|---|---|---|---|
| 8 | 1-benzoyl-2-pyridylcarbonyl-pyrrolidine-5-one | | |
| 9 | 1-benzoyl-2-pyrrolidylcarbonyl-pyrrolidine-5-one | | (M.P. 137°–138°C) |
| 10 | 1-(p-chloro)-benzoyl-pyrrolidine-5-one-2-(N,N-dimethyl)-carboxamide | | |
| 11 | 1-(p-fluoro)-benzoyl-pyrrolidine-5-one-2-(N,N-diethyl)-carboxamide | | |
| 12 | 1-(p-chloro)-benzoyl-pyrrolidine-5-one-2-(N,N-di-n-propyl)-carboxamide | | |
| 13 | 1-(p-bromo)-benzoyl-pyrrolidine-5-one-2-(N,N-dimethyl)-carboxamide | | |

Of the present compounds preferable are those having the formula (I) before in which $R_1$ and $R_2$ are respectively alkyl groups having 1 to 6 carbon atoms or taken collectively form tetramethylene group and Y is hydrogen atom. Preferable examples of the present compounds are 1-benzoyl-pyrrolidine-5-one-2-(N,N-dimethyl)-carboxamide, 1-benzoyl-pyrrolidine-5-one-2-(N,N-diethyl)-carboxamide, 1-benzoyl-pyrrolidine-5-one-2-(N,N-di-n-propyl)-carboxamide, 1-benzoyl-pyrrolidine-5-one-2-(N,N-di-n-butyl)-carboxamide, 1-benzoyl-pyrrolidine-5-one-2-(N,N-dipentyl)-carboxamide, 1-benzoyl-pyrrolidine-5-one-2-(N,N-dihexyl)-carboxamide and 1-benzoyl-2-pyrrolidylcarbonyl-pyrrolidine-5-one.

The novel pyrrolidone derivative of this invention can be produced by reacting pyrrolidine-5-one-2-(N,N-dialkyl)-carboxamide represented by the formula (II)

wherein $R_1$ and $R_2$ are the same as defined before with an aroyl halide represented by the formula (III)

wherein Y is the same as defined before and X is a halogen atom in the presence of an alkali metal, alkaline earth metal or a hydride or alcoholate thereof.

Typical examples of the compound represented by formula (II) are pyrrolidine-5-one-2-(N,N-dimethyl)-carboxamide, pyrrolidine-5-one-2-(N,N-diethyl)-carboxamide, pyrrolidine-5-one-2-(N,N-di-n-propyl)-carboxamide, pyrrolidine-5-one-2-(N,N-di-n-butyl)-carboxamide, pyrrolidine-5-one-2-(N,N-di-n-pentyl)-carboxamide, pyrrolidine-5-one-2-(N,N-di-n-hexyl)-carboxamide, 2-morpholinocarbonyl-pyrrolidine-5-one, 2-pyridylcarbonyl-pyrrolidine-5-one, 2-pyrrolidylcarbonylpyrrolidine-5-one, etc.

Examples of the aroyl halide having formula (III) are benzoylchloride, 4-chloro-benzoylchloride, 4-fluoro-benzoylchloride, 4-bromo-benzoylchloride, 4-iodo-benzoylchloride, benzoylbromide, 4-chlorobenzoylbromide, 4-iodo-benzoylbromide, 4-bromo-benzoylbromide, benzoyliodide, etc. The pyrrolidine-5-one-2-(N,N-dialkyl)-carboxamides of formula (II) to be used as the starting material are prepared by various processes, for example by the following process.

Glutamic acid is first heated in an autoclave in the presence of water to obtain pyrrolidine-5-one-2-carboxylic acid, which is then reacted with anhydrous methyl alcohol in the presence of acidic catalyst such as boron fluoride, hydrogen chloride or the like to prepare pyrrolidine-5-one-2-carboxylic acid methyl ester. The ester is subsequently reacted with a secondary amine represented by the formula

wherein $R_1$ and $R_2$ are as defined above, exemplary of which are N,N-dimethylamine, N,N-diethylamine, N,N-di-n-propylamine, N,N-di-n-butylamine, N,N-di-n-hexylamine, N,N-methylethylamine, N,N-methyl-n-propylamine, pyrrolidine, piperidine, morpholine, etc.

The reaction of the compound of formula (II) with the aroyl halide of the formula (III) to produce the present pyrrolidne derivative is conducted in the presence of a metal compound. The metal compounds to be used in the reaction are alkali metals, alkaline earth metals and hydrides and alcoholates thereof. Examples are lithium, sodium, potassium, and like alkali metals, calcium, barium, strontium, magnesium, and like alkaline earth metals, NaH, LiH, KH, $CaH_2$, $MgH_2$ and like metal hydrides, $NaOCH_3$, $NaOC_2H_5$, $KOCH_3$, $KOC_2H_5$ and like alcoholates. Among these metals or their compounds, NaH is particularly preferable for use in this reaction.

According to the reaction to produce the pyrrolidone derivative of this invention, pyrrolidine-5-one-2-(N,N-dialkyl)-carboxamide (tertiary amide) of formula (II) is first reacted with one of alkali metals, alkaline earth metals or hydrides or alcoholates thereof and the resulting product is then reacted with an aroyl halide of the formula (III). Therefore, it is preferable to first charge the compound of formula (II) and metal compound to effect the reaction therebetween and thereafter to add the aroyl halides of formula (III) to the reaction system to produce the present pyrrolidone derivative, although the three reactants can be added to the reaction system together. The metal compound and aroyl halide of formula (III) can preferably be used in equimolar amount or in excess amount to the compound of formula (II).

Although the use of solvent is not necessarily essential to the reaction, the presence of solvent permits the reaction to proceed with ease. For this purpose, a wide variety of solvents can be used as far as they are inert in the present reaction. The presence of water in the reaction system should be avoided, since the water inhibits the present reaction. Therefore, the solvent to be used is one free from water. The solvents include, for example, tetrahydrofuran, dioxane and like ethers, benzene, toluene and like hydrocarbons.

Usually, the reaction temperature is about 0° to 50°C, preferably about 0° to 20°C. According to one of preferred methods of the invention the compound of formula (II) is reacted with metal compound at a temperature of about 5° to 10°C and then the resulting reaction product is reacted with the compound of formula (III) at about 0° to 20°C to produce the pyrrolidone derivative of the invention. The reaction pressure may be atmospheric, but a higher pressure can be employed. In the case the solvent used has a high solidifying point, reaction at an increased pressure lowers the solidifying point and is therefore advantageous.

The pyrrolidone derivative represented by formula (I) of this invention has an excellent inhibitive action on the secretion of gastric juice and therefore can be advantageously used for treating peptic ulcer.

The pharmacological activities of the pyrrolidone derivatives of this invention were determined with the following results. The inhibitory action on the secretion of gastric juice was measured in the following manner, using Schield's rat method with stimulation of continuous gastrin injection.

Method of Experiment:

Male rats, Wister strain of Schield's rats, weighing 300 to 350 g were starved for 48 hours, and 25 percent urethane solution was administered intraperitoneally in a dose of 0.7 ml/kg to bring them into general anaesthetic condition. The greater curvature of proventriculus of the rat was sectioned on the operating table in a thermostat chamber at 34° ± 0.5°C.

The residue in the stomach was thoroughly washed off with physiological saline using a pipet. The section part was then sutured. The duodenum proximate to the pylorus was sectioned. Then a polyethylene tube of 2 mm in diameter was placed into the stomach through the pylorus from the duodenal section part. Another polyethylene tube of 2 mm in diameter was inserted into the ventlale from the mouth through the esophagus and was fixedly ligated along with the esophagus. Through this tube an aqueous NaOH solution of pH 8.5 warmed to about 34°C was infused from the mouth at a rate of 1 ml/min by a constant infusion pump. After the continual infusion in the cannula inserted into the duodenum had turned clear, the section part was sutured. To administer tetragastrin intraveneously, a thin polyethylene cannula was then inserted into the venous femoralis, a three-way cock being used for the administration of tetragastrin solution and physiological saline. The dilute solution of NaOH of pH 8.5, continually infused into the stomach at a rate of 1 ml/min, flowed through the pylorus by way of the polyethylene tube to connect glass electrodes. The pH value was continuously recorded on a recorder. More specifically, tetragastrin was continuously injected into the venous femoralis at a dose of 3 μg/kg/ml/hr for 30 minutes and the pH of outflowing gastric juice was recorded. About 1 hour after the pH of the outflowing gastric juice had returned to the original value before the first injection of tetragastrin, tetragastrin was injected continuously again at the same rate to ascertain that the reduced integral of pH was equal to the previous result. The pyrrolidone compound of this invention was then administered intraperitoneally at doses of 100 mg/kg/ml/hr and 400 mg/kg/ml/hr. Thirty minutes after the initiation of injection of the compound, tetragastrin was continuously injected again at a dose of 3 μg/kg/ml/hr for 30 minutes. The reduced integral of pH of the outflowing gastric juice was measured.

The inhibitory effect was determined by the following formula:

$$\text{Inhibitory effect (\%)} = \frac{A - B}{A} \times 100$$

wherein A is a reduced integral of pH when tetragastrin was administered alone and B is a reduced integral of pH when tetragastrin was administered in combination with the present pyrrolidone derivative. The results are shown in Table 2. The compound numbers used in Table 2 are the same as those in Table 1.

Table 2

| Compounds No. | Inhibitory effect (%) at 100 mg/kg | at 400 mg/kg |
|---|---|---|
| 1 | 35 | 70 |
| 2 | 45 | 77 |
| 3 | 57 | 80 |
| 4 | 47 | 73 |
| 9 | 42 | 71 |

The acute toxicity was evaluated for intraperitoneal administration, in mice which had been deprived of food for 48 hours before the start of experiment. The $LD_{50}$ was calculated by the method of Litchfield and Wilcoxon. The 50% lethal dose ($LD_{50}$) in milligrams per kilogram of body weight, are given in Table 3 below.

Table 3

| Compound No. | Acute toxicity ($LD_{50}$ : mg/kg) |
|---|---|
| 1 | 2,600 |
| 2 | 1,850 |
| 3 | 2,050 |
| 4 | 2,130 |
| 9 | 2,340 |

As evident from the above test results the present pyrrolidone derivatives have excellent inhibitory action on the secretion of gastric juice with makedly low toxicity. Therefore the present compounds are useful as medicine for treating peptic ulcer.

The present pyrrolidone derivative can be made up in a form suitable for oral administration to man, generally combined with pharmaceutically acceptable excipients and/or diluents. Thus, for example, suitable compositions can be in the form of tablets or capsules. Examples of the excipients and diluents are colloidal silica, micro-crystalline cellulose, lactose, magnesium stearate, starch, carboxy methyl cellulose or polyvinylpyrrolidone, etc.

The present compound of formula (I) is further used as a material for preparing 2-aroylamide-N,N-dialkylisoglutaramine acid derivative which is already known as a medicine having an inhibitive action on the secretion of gastric juice and effective for healing peptic ulcer, this derivative being represented by the formula

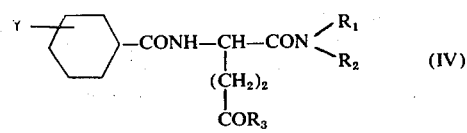

wherein $R_1$, $R_2$ and Y are as defined above, and $R_3$ is hydroxy, alkoxy having 1 to 6 carbon atoms, alkylmercapto having 1 to 6 carbon atoms, amino or substituted amino group.

The 2-aroylamide-N,N-dialkylisoglutaramine acid derivative of formula (IV) can be produced easily from the compound of this invention by reacting it with a compound represented by the formula

wherein $R_3$ is as defined above in the presence of an acid or base.

Examples of the compound represented by formula (V) above include, for example, water; alcohols such as methyl alcohol, ethyl alcohol, n-propyl alcohol, iso-propyl alcohol, n-butyl alcohol, sec-butyl alcohol, tert-butyl alcohol, 1-pentanol, 2-pentanol, 3-pentanol, cyclopentanol, 1-hexanol, 2-hexanol, 3-hexanol, etc.; mercaptans such as methyl mercaptan, ethyl mercaptan, n-propyl mercaptan, iso-propyl mercaptan, n-butyl mercaptan, sec-butyl mercaptan, tert-butyl mercaptan, 1-pentamercaptan, 2-pentamercaptan, 3-pentamercaptan, cyclopentamercaptan, 1-hexamercaptan, 2-hexamercaptan, 3-hexamercaptan, cyclohexamercaptan, etc.; amines such as dimethylamine, diethylamine, di-n-propylamine, pyrrolidine, piperidine, morpholine, ammonia, monomethylamine, monopropylamine, monobenzylamine, etc.

The reaction to produce the compound of formula (IV) is conducted in the presence or absence of acid or alakli catalysts, such as mineral acids, Lewis acids, Lewis bases, caustic alkalis, etc. The reaction is usually carried out at a temperature of lower than 100°C at an atmospheric or increased pressure. Generally, the reaction is completed within about 5 hours.

According to this process, the desired 2-aroylamide-N,N-dialkylisoglutaramine acid derivative represented by formula (IV) can be prepared selectively in higher yield and with higher purity as compared with the conventional process, free of the production of glutamine type derivatives as byproducts. Thus the present process has the advantage that a nearly constant amount of the desired product can be obtained without conducting separation and purification.

REFERENCE EXAMPLE 1

200 g of dl-glutamic acid and 600 g of water are placed into an autoclave, heated at 170°C for 5 hours and thereafter cooled overnight at 5° to 10°C to separate out dl-pyrrolidine-5-one-2-carboxylic acid. The resulting crystals are drawn out, filtered and washed with 130 ml of distilled water. The crystals are then dried in an oven heated to 100°C at a reduced pressure of 15 mm Hg, whereby 125 g of crystals melting at 181 to 182°C are obtained. 10 g of an ether solution of 43% by weight of boron fluoride is dissolved in 1,000 ml of anhydrous methyl alcohol, and the dl-pyrrolidine-5-one-2-carboxylic acid is added to the resulting solution, followed by stirring. The solution thus prepared is left to stand for 10 hours. The solution is then passed through a column packed with 200 ml of Amberlite 10R (trade mark, ion exchange resin of Rohm and Haas Co., U.S.A.) to remove boron fluoride. Subsequently, methyl alcohol is distilled off under a reduced pressure to concentrate the solution to about one-seventh the original amount. 350 ml of benzene and 75 g of anhydrous magnesium sulfate are added to the concentrate, followed by shaking and then filtration. The benzene solution of the filtrate is distilled off under a reduced pressure to obtain a residue, which is distilled in a vacuum to give 90 g of methyl-dlpyrrolidine-5-one-2-carboxylate as a fraction boiling at 133° to 135°C at 1 mm Hg.

20 g of the methyl-dl-pyrrolidine-5-one-2-carboxylate and 15 g of di-n-propylamine are dissolved in 100 ml of dioxane. The solution is placed in an autoclave for reaction at 130° to 160°C for 3 hours. The reaction mixture is distilled at a reduced pressure to remove the dioxane and excess amine. The resulting product is dissolved in 10 ml of a mixture of chloroform and methyl alcohol (95 : 5), and the solution is passed through a column packed with 100 g of silica gel for adsorption. After the chloroform-methyl alcohol mixture has been distilled off under a reduced pressure, the residue is recrystallized from a mixture of n-hexanebenzene to give pyrrolidine-5-one-2-(N,N-di-n-propyl)-carboxamide crystals melting at 84° to 86°C.

REFERENCE EXAMPLE 2

A mixture of 5 g of methyl-dl-pyrrolidine-5-one-carboxylate and 30 ml of di-n-butylamine is placed in an autoclave and reacted at 200°C for 5 hours. The reaction mixture is distilled off under a reduced pressure to remove excess amine, dissolved in 10 ml of a mixture of chloroform and methyl alcohol (95 : 5) and passed through a column packed with 40 g of silica gel. After the chloroform-methyl alcohol mixture has been distilled off under a reduced pressure, the residue is distilled in a vacuum to give 2.4 g of pyrrolidine-5-one-2-(N,N-di-n-butyl)-carboxamide as a fraction boiling at 185 to 190°C under 0.5 mm Hg. After cooling for 2 days the fraction crystalized. It melt at 37° to 39°C.

EXAMPLE 1

Synthesis of
1-benzoyl-pyrrolidine-5-one-2-(N,N-di-n-propyl)-carboxamide 10 g of pyrrolidine-5-one-2-(N,N-di-n-propyl)-carboxamide is dissolved in 200 ml of anhydrous benzene. About 100 ml of the solution is distilled off at atmospheric pressure, and 2.26 g of sodium hydride mixed with mineral oil is slowly added to the resulting solution while it is being cooled with ice water with stirring. After the generation of hydrogen has terminated, the mixture is stirred at room temperature for 1 hour and 6.65 g of benzoyl chloride in 10 ml of anhydrous benzene is added dropwise, followed by stirring for about 10 hours, whereupon the reaction is completed. The benzene layer of the reaction mixture is washed with 30 ml of 3% aqueous solution of hydrochloric acid, then with 30 ml of 10% aqueous solution of sodium hydrogen carbonate, dried with anhydrous sodium sulfate and filtered. The benzene layer of the filtrate is distilled off under a reduced pressure. The resulting residue is recrystallized from a mixture of benzene and n-hexane to give 11.1 g of colourless needle-like crystals melting at 77° to 78°C.

Elementary analysis as $C_{18}H_{24}N_2O_3$: Calculated: C : 68.33; H : 7.65; N : 8.86. Found: C : 68.21; H : 7.63; N : 8.77. IR spectrum (1 mg/600 mg KBr): $\nu_{max}^{KBr}$ cm$^{-1}$: 3050, 2940, 2920, 2860, 1740, 1655, 1640, 1600, 1580, 1443, 1295 (functional group region).

EXAMPLE 2

Synthesis of
1-benzoyl-pyrrolidine-5-one-2-(N,N-di-n-butyl)-carboxamide 2 g of pyrrolidine-5-one-2-(N,N-di-n-butyl)-carboxamide is dissolved in 100 ml of anhydrous benzene. About 50 ml of the solution is distilled off at atmospheric pressure and 0.38 g of sodium hydride mixed with mineral oil is slowly added to the concentrated solution while it is being cooled with ice water with stirring. After the generation of hydrogen has terminated, the mixture is stirred at room temperature for 1 hour, and 1.17 g of benzoyl chloride in 5 ml of anhydrous benzene is added dropwise, followd by stirring for about 10 hours, whereby the reaction is completed. The benzene layer of the reaction mixture is washed with 20 ml of 3% aqueous solution of hydrochloric acid, then with 20 ml of 10% aqueous solution of sodium hydrogen carbonate, dried with anhydrous sodium sulfate and filtered. The benzene layer of the filtrate is passed through a column packed with 10 g of silica gel for adsorption. After the benzene has been distilled off under a reduced pressure, the residue is recrystallized from a mixture of n-hexane and benzene to give 1.7 g of colourless needlelike crystals melting at 56° to 58°C.

Elementary analysis as $C_{20}H_{28}N_2O_3$: Calculated: C : 69.74; H : 8.13; N : 8.13. Found: C : 69.94; H : 8.34; N : 7.86. IR spectrum (1 mg/600 mg KBr): $\nu_{max}^{KBr}$ cm$^{-1}$: 3045, 2940, 2910, 2850, 1740, 1670, 1630, 1600, 1580, 1447, 1293 (functional group region).

EXAMPLE 3

Synthesis of
1-benzoyl-pyrrolidine-5-one-2-(N,N-diethyl)-carboxamide.

Reaction was conducted in the same manner as Example 2, except that the pyrrolidine-5-one-2-(N,N-diethyl)-carboxamide was used. 9.6 g of 1-benzoyl-pyrrolidine-5-one-2-(N,N-diethyl)-carboxamide were produced in the form of colourless viscous oil.

Elementary analysis as $C_{16}H_{20}N_2O_3$: Calculated: C : 66.65; H : 6.99; N : 9.71. Found: C : 66.89; H : 6.75; N : 9.50. IR spectrum (NaCl film): $\nu_{max}^{NaCl}$cm$^{-1}$: 3050, 2940, 2910, 2860, 1730, 1670, 1625, 1600, 1585, 1445 1290 (functional group region).

EXAMPLE 4

Synthesis of 1-benzoyl-pyrrolidine-5-one-2-(N,N-di-n-hexyl)-carboxamide

Reaction was conducted in the same manner as Example 2, except that the pyrrolidine-5-one-2-(N,N-di-n-hexyl)-carboxamide was used. 1.7 g of 1-benzoyl-pyrrolidine-5-one-2-(N,N-di-n-hexyl)-carboxamide were produced in the form of colourless viscous oil.

Elementary analysis as $C_{24}H_{36}N_2O_3$: Calculated: C : 71.96; H : 9.06; N : 6.99. Found: C : 71.83; H : 8.85; N : 7.21. IR spectrum (NaCl film): $\nu_{max}^{NaCl}$cm$^{-1}$: 3050, 2910, 2840, 1740, 1660, 1640, 1600, 1585, 1440, 1290 (functional group region).

EXAMPLE 5

Synthesis of 1-benzoyl-pyrrolidine-5-one-2-(N,N-di-n-amyl)-carboxamide.

Reaction was conducted in the same manner as Example 2, except that pyrrolidine-5-one-2-(N,N-di-n-amyl)-carboxamide was used. 1.2 g of 1-benzoylpyrrolidine-5-one-2-(N,N-di-n-amyl)-carboxamide were produced in the form of colourless viscous oil.

Elementary analysis as $C_{22}H_{32}N_2O_3$: Calculated: C : 70.94; H : 8.66; N : 7.52. Found: C : 71.20; H : 8.47; N : 7.48. IR spectrum (NaCl film): $\nu_{max}^{NaCl}$cm$^{-1}$: 3040, 2910, 2850, 1740, 1660, 1640, 1610, 1590, 1440 1290 (functional group region).

EXAMPLE 6

Synthesis of 1-benzoyl-pyrrolidine-5-one-2-(N,N-tetramethylene)-carboxamide

Reaction was conducted in the same manner as Example 2, except that pyrrolidine-5-one-2-(N,N-tetramethylene)-carboxamide was used. 0.5 g of 1-benzoyl-pyrrolidine-5-one-2-(N,N-tetramethylene)-carboxamide was produced in the form of white crystal. It melt at 137° to 138°C.

Elementary analysis as $C_{16}H_{18}N_2O_3$: Calculated: C : 67.13; H : 6.29; N : 9.80. Found: C : 66.96; H : 6.15; N : 9.34. IR spectrum (NaCl film): $\nu_{max}^{NaCl}$cm$^{-1}$: 3400, 3050, 2950, 2910, 2855, 1745, 1670, 1635, 1445, 1355, 1315, 1270, 1230 (functional group region).

EXAMPLE 7

Synthesis of 1-benzoyl-pyrrolidine-5-one-2-(N,N-dimethyl)-carboxamide

Reaction was conducted in the same manner as Example 2, except that pyrrolidine-5-one-2-(N,N-dimethyl)-carboxamide was used, to produce 1-benzoylpyrrolidine-5-one-2-(N,N-dimethyl)-carboxamide in the form of white crystal. It melt at 204° to 205°C.

Elementary analysis as $C_{14}H_{16}N_2O_3$: Calculated: C : 60.46; H : 6.15; N : 10.76. Found: C : 59.94; H : 6.13; N : 10.58. IR spectrum (NaCl film): $\nu_{max}^{NaCl}$cm$^{-1}$: 3460, 3300, 2950, 2900, 2300, 1750, 1645, 1630, 1495, 1445, 1410, 1395, 1315, 1270, 1230 (functional group region).

What we claim is:

1. A pyrrolidone derivative represented by the formula

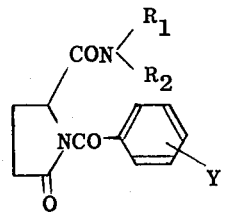

wherein $R_1$ and $R_2$ are the same alkyl group having 1 to 6 carbon atoms or taken collectively form a tetramethylene group and Y is hydrogen or a halogen atom.

2. The pyrrolidone derivative according to claim 1, in which said Y is a hydrogen atom.

3. A pyrrolidone derivative according to claim 1 which is one species selected from the group consisting of 1-benzoyl-pyrrolidine-5-one-2-(N,N-dimethyl)-carboxamide, 1-benzoyl-pyrrolidine-5-one-2-(N,N-diethyl)-carboxamide, 1-benzoyl-pyrrolidine-5-one-2-(N,N-di-n-propyl)-carboxamide, 1-benzoyl-pyrrolidine-5-one-2-(N,N-di-n-butyl)-carboxamide, 1-benzoyl-pyrrolidine-5-one-2-(N,N-dipentyl)-carboxamide, 1-benzoyl-pyrrolidine-5-one-2-(N,N-dihexyl)-carboxamide and 1-benzoyl-2-pyrrolidylcarbonyl-pyrrolidine-5-one.

* * * * *